United States Patent [19]

Jackson

[11] Patent Number: 4,945,310
[45] Date of Patent: * Jul. 31, 1990

[54] PASSIVE GEOPHYSICAL SURVEY METHOD BASED UPON THE DETECTION OF THE DC COMPONENT OF THE VERTICAL ELECTRICAL POTENTIAL OF NATURAL EARTH CURRENTS

[75] Inventor: John R. Jackson, 1401 E. Girard, #143, Englewood, Colo. 80110

[73] Assignees: J. R. Jackson; A. M. Arismendi, Jr., both of Gaithersburg, Md.

[*] Notice: The portion of the term of this patent subsequent to Jun. 20, 2006 has been disclaimed.

[21] Appl. No.: 367,018

[22] Filed: Jun. 16, 1989

Related U.S. Application Data

[62] Division of Ser. No. 821,967, Jan. 29, 1986, Pat. No. 4,841,250.

[51] Int. Cl.$^5$ .................. G01V 3/165; G01V 3/08
[52] U.S. Cl. .................... 324/349; 324/344
[58] Field of Search .......... 324/344, 149, 347–350, 324/357, 362, 373

[56] References Cited

U.S. PATENT DOCUMENTS

| | | | |
|---|---|---|---|
| 3,087,111 | 4/1963 | Lehan et al. | 324/344 |
| 3,136,943 | 6/1964 | Slichter | 324/344 |
| 3,197,704 | 7/1965 | Simon et al. | 324/344 X |
| 3,361,957 | 1/1968 | Hings | 324/349 |
| 3,510,766 | 5/1970 | Russell et al. | 324/149 |
| 3,662,260 | 5/1972 | Thomas et al. | 324/344 X |
| 3,679,978 | 7/1972 | Hopkins, Jr. | 324/357 X |
| 3,942,101 | 3/1976 | Sayer et al. | 324/344 |
| 3,986,207 | 10/1976 | Gerbel et al. | 324/350 X |
| 4,198,596 | 4/1980 | Waeselynck et al. | 324/344 |
| 4,409,551 | 10/1983 | Norton | 324/349 |
| 4,507,611 | 3/1985 | Helms | 324/348 X |
| 4,584,530 | 4/1986 | Nicholson | 324/348 X |
| 4,658,215 | 4/1987 | Vinegar et al. | 324/373 X |
| 4,686,475 | 8/1987 | Kober et al. | 324/349 |
| 4,825,165 | 4/1989 | Helms et al. | 324/344 X |
| 4,841,250 | 6/1989 | Jackson | 324/349 |

OTHER PUBLICATIONS

Boisonnas et al, "Geophysical Exploration By Telluric Currents, With Special Reference to a Survey of the Haynesville Salt Dome, Wood County, Tex.", *Geophysics*, Jul. 1948, pp. 387–403.

Primary Examiner—Reinhard J. Eisenzopf
Assistant Examiner—Warren S. Edmonds
Attorney, Agent, or Firm—A. M. Arismendi, Jr.

[57] ABSTRACT

A geophysical prospecting method of measuring potentials existing in the air in the area of the lower atmosphere between about one and ten meters above the surface of the earth in order to detect petroleum accumulations and mineral deposits below the surface of the earth. The method mounts a detector device is mounted on the front bumper of an off-the-road vehicle and moves the vehicle across the surface of a given area of earth in a more or less continuous fashion. Changes in the electron flow through the ion field at the surface of the earth to increased and decreased resistivity values in the crust of the earth are recorded.

6 Claims, 3 Drawing Sheets

PASSIVE GEOPHYSICAL SURVEY METHOD BASED UPON THE DETECTION OF THE DC COMPONENT OF THE VERTICAL ELECTRICAL POTENTIAL OF NATURAL EARTH CURRENTS

This application is a division of application Ser. No. 821,967, filed Jan. 24, 1986, now U.S. Pat. No. 4,841,250.

This invention relates to methods and apparatus for performing geophysical measurements and the like, and more particularly relates to improved methods and apparatus for locating and identifying selected subsurface earth materials as a function of electromagnetic earth radiations and fields.

It is well known that petroleum deposits, ore bodies, and other valuable earth materials are found at various locations and depths in the earth, and that these deposits, etc. are often difficult if not impossible to find with the naked eye. Accordingly, it is also well known that many different exploration techniques and systems have been developed to provide a reliable indication of the presence of these mineral deposits.

It is conventional, of course, to drill test holes at locations of particular interest, and to recover samples of earth materials at various depths, to determine the actual character of the earth materials. However, it is both expensive and time consuming to drill a test hole, especially into deeper strata, and therefore test holes are seldom drilled except on a limited basis.

It is conventional to measure topographical irregularities, in order to obtain an indication of the existence of subsurface structures of particular interest. Similarly, it is conventional for this purpose to measure differences in seismic reverberations, and to measure variations in gravitational pull at selected locations. Although such measurements are often used with success to locate faults, traps and other subsurface earth structures wherein oil and other valuable minerals could be found, most stratagraphic traps and the like do not contain such minerals, and therefore such measurements are most useful for eliminating unlikely areas of interest, rather than to detect actual deposits of minerals.

It is known, of course, that this planet itself constitutes and functions as a generator of electro-magnetic radiations which, in turn, create current flows within the earth. Accordingly, measurement techniques such as those described in U.S. Pat. No. 3,679,978 have been developed in recent years to detect and analyze these magneto-telluric currents within the earth bed adjacent the surface, as a direct indication of selected minerals of interest. Although such techniques have been proven to be effective for locating and measuring the extent of ore bodies, these techniques do not indicate the type of minerals present.

It will be apparent that if the planet is a generator of electro-magnetic radiations within itself, these current flows within the earth will include both DC and AC currents which will be functionally related to both the individual mineral-bearing formations and their contents. Furthermore, it will be apparent that current flows within but adjacent the surface of the earth will inherently create functionally related electrical fields adjacent but above the surface of the earth.

It has previously been determined that these above-surface current flows are composed of AC carrier waves having frequencies indicative of the depth of the particular formations which generate these carrier waves or signals, and that these so-called carrier waves each "carry" a more complex signal having a frequency which is a characteristic of the type of mineral contained in that formation. In particular, apparatus and techniques have been successfully employed to locate and determine that depth of a particular formation of interest, and to analyze the frequency of the signal carried by the carrier wave to determine the type of mineral contained in that formation.

Although this new technique has been used quite effectively, it is based on the AC components of these geomagnetic radiations which exist near but above the surface of the earth, and it is therefore more effective and reliable depending upon the size or areal extent of the mineral deposit of interest. More particularly, this technique is less sensitive and effective in detecting the presence of smaller mineral deposits.

These disadvantages of the prior art are overcome with the present invention, and improved methods and apparatus are provided for obtaining a more sensitive and precise measurement of the presence and character of relatively small deposits of valuable minerals.

THEORY OF INVENTION

The phenomenae, which provide the basis for this measurement technique, are not yet fuly understood. It is believed, however, that the earth is a generator of a complex of DC current flows, and that these DC currents tend to appear immediately above as well as below the surface of the earth. Accordingly, if a pair of spaced-apart electrodes are arranged within these DC fields or current flows adjacent but above the earth, a potential may be measured across these two electrodes which will be functionally related in magnitude to the lithological characteristics of the earth materials adjacent such electrodes.

Such current flows are extremely small, and are often coexistent with other interfering signals having no relationship to the lithological characteristics sought to be observed. Accordingly, such signals must be processed to eliminate or substantially reduce the significance of noise and other spurious components, as well as to amplify those signals or potentials of particular interest.

A particular reason why this phenomenon is not fully understood, is that the observability of such potentials is especialy susceptible to atmospheric characteristics such as humidity and the like, and also to the time of day when measurements are sought to be taken. For example, it has been noted that these measurements are most reliable when taken during the day time, and when atmospheric humidity and wind velocity is relatively low, whereby these potentials seem to most likely occur because of ionization caused by irradiation of the earth's atmosphere by sunlight. In contrast, such measurements become uncertain during overcast periods or rainstorm conditions and the like, and are usually almost impossible to observe after nightfall.

SUMMARY OF INVENTION

In a preferred embodiment of the present invention, new methods and apparatus are provided for detecting and measuring the DC components of electro-magnetic radiations adjacent the surface of the earth, as a function of the presence and character of subsurface mineral deposits. More particularly, a pair of spaced-apart antennae may be mounted at opposite ends of a vehicle to sense current flows generated by magnetic-telluric fields above and about the surface of the earth, wherein each antenna is composed of a pair of spaced-apart electrodes interconnected with a suitable connector switch.

The electrodes of one antenna are preferably spaced apart a different distance than are the electrodes of the other antenna, whereby the selector switch is preferably arranged and adapted to couple both pairs of electrodes simultaneously but separately to suitable processing circuits.

As hereinbefore indicated, this technique is intended to utilize the DC components of these magneto-telluric fields, and therefore the selector switch is further arranged to couple the two antenna inputs to a variable AC filter which is appropriately adjusted to compensate for variations in both amplitude and frequency because of variations in ambient weather conditions.

The filtered signals are inherently weak (of low amplitude), and therefore the filtered signal is preferably applied initially to a pre-amplifier having a range of 0-200,000, and thereafter to a main amplifier having a range of 0-4,000. More particularly, it will be noted that, with any amplifier, there is a tendency for distortion of the signal at the upper limits of the curve. Furthermore, it is preferable for the purposes of this invention that provision be included for balancing the circuit whereby both antenna input signals are equalized at all times.

After amplification, the two antenna signals are then preferably applied to a comparator or the like. Inasmuch as both antennae are maintained a fixed difference apart, and the spacing between the electrodes of one antenna is also fixed but different from the electrode spacing on the other antenna, it will be apparent that the voltage differential between these two inputs will be a direct function of the ionization existing at the location of interest, and that the magnitude of ionization between the two antennae is a function of the subsurface lithology at such location. Therefore, the output of the comparator is intended to represent that function, and therefore this signal may be oberved and recorded as an indication of the presence of minerals being traversed by the moving vehicle.

It will be apparent, of course, that it is desirable if not essential to include an indication of the location of the vehicle in conjunction with the measurements being derived by the present invention. Therefore, it is preferable to interconnect an output function from the odometer of the vehicle, with the geophysical measurements being derived as the vehicle traverses a predetermined course.

It will be apparent, of course, that if ionization of the atmosphere is functionally related to the lithological character of the underlying earth materials, and if the potential across a pair of electrodes is a function of such ionization, then a single pair of electrodes will suffice to measure such earth materials. In this invention, however, these potentials are most evident when the two electrodes are positioned vertically above the surface of the earth, and therefore it will also be apparent that the potential measured across a vertical pair of electrodes will tend to relate to a relatively small areal extent of earth materials of interest. For this reason, it is preferable to employ two pairs of electrodes, and to compare the difference between the two potential measurements in order to more effectively survey the geology of the underlying earth structures and materials. Furthermore, if the two pairs of electrodes are mounted at opposite ends of a moving vehicle, sharp changes in this difference will provide a more evident indication of the fact that the vehicle has traversed a fault or other subsurface discontinuity or the like.

In some particular instances, however, it may be convenient or even desirable to employ only one pair of electrodes for this purpose. Accordingly, it may be suitable to dispose a selector switch between each electrode pair and the processing circuitry, whereby one or the other electrode pair may be selectively connected to or disconnected from the processing circuitry.

Accordingly, it is an object and feature of the present invention to provide improved geophysical measurements of DC components of electromagnetic fields subsisting above and adjacent the surface of the earth.

It is also an object and feature of the present invention to provide more sensitive and accurate measurements of DC components of electromagnetic fields subsisting above the surface of the earth, as a function of the presence and character of selected earth materials below the adjacent surfaces of the earth.

It is another object and feature of the present invention to measure a DC potential existing adjacent and above the surface of the earth as a function of the ionization of electromagnetic fields related to the presence and character of selected earth materials adjacent and below the surface of the earth.

It is a specific object and feature of the present invention to provide novel apparatus for performing geophysical measurement and the like, comprising a first non-polarized electrode spaced above the earth and within the lower atmosphere adjacent thereto, a second non-polarized electrode arranged within said lower atmosphere and vertically above said first electrode, circuit means for sensing an electrical potential occurring between said electrodes as a function of natural earth currents adjacent said electrodes, and measuring means interconnected with said circuit means for deriving an indication of the lithological character of adjacent earth materials as a function of said electrical potential.

These and other features and advantages of the present invention will become apparent from the following detailed description, wherein reference is made to figures in the accompanying drawings.

IN THE DRAWINGS

DETAILED DESCRIPTION

Figure 1:
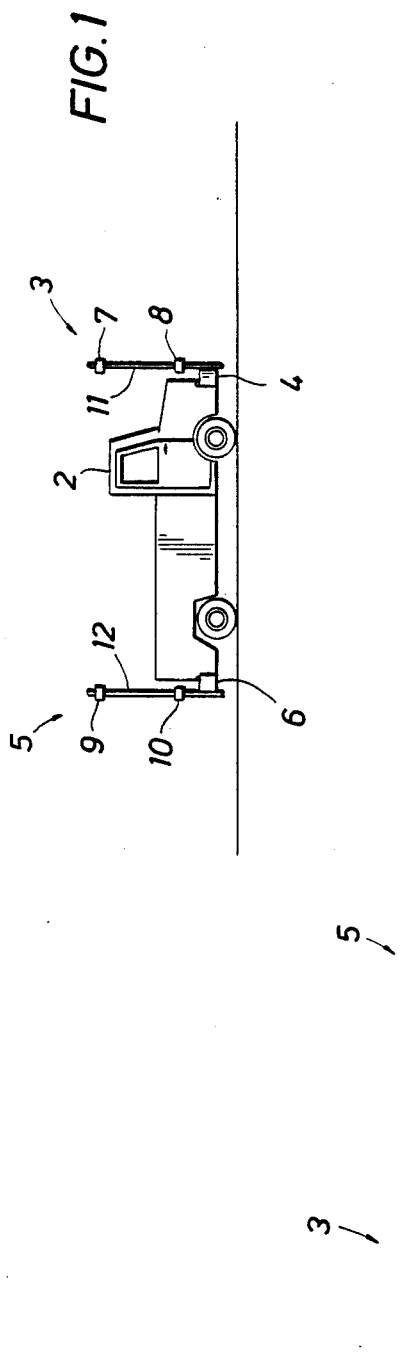
FIG. 1 is a simplified pictorial representation of a movable vehicle equipped with geophysical survey apparatus embodying the present invention.

Referring now to FIG. 1, there may be seen a simplified pictorial representation of a self-propelled vehicle suitable for traversing areas of interest and adapted to carry geophysical survey apparatus preferably employing a first antenna 3, which may conveniently be supported on the front bumper 4, and a second antenna 5 supported on the rear bumper 6. More particularly, the first antenna 3 is preferably composed of lower and upper electrodes 7 and 8, respectively, mounted on an insulating mast 11, and spaced approximately three feet apart to develop a DC voltage functionally related to the magnitude of ionization generated in the atmosphere by the earth materials immediately below the front bumper 4. The second antenna 5 is similar to the first antenna 3, in that it is preferably composed of an insulating mast 12 fixedly mounted on the rear bumper 6 and vertically supporting lower and upper electrodes 9 and 10 respectively also spaced approximately three feet apart for developing a DC voltage functionally related to atmospheric ionization immediately adjacent the rear bumper 6.

As hereinbefore indicated, the vehicle 2 is preferably caused to traverse an area of interest along a preselected course while generating and recording measured indications of atmospheric ionization along such course. Accordingly, it is within the concept of the present invention to generate and correlatively record an indication of the distance along such course, and to derive such distance indication from the odometer (not depicted) in the vehicle 2.

It is significant to the purposes of the present invention that both pairs of electrodes 7-10 be arranged approximate to but spaced a sufficient distance above the surface of the earth at all times. Accordingly, it has been found convenient to space both lower electrodes 7 and 9 approximately twelve to eighteen inches above the surface of the earth, whereby neither of the two lower electrodes 7 and 9 will encounter even weeds and grasses along the course.

As hereinafter indicated, it is within the concept of the present invention to measure and record the ionization encountered across either the lower and upper electrodes 7 and 8 respectively of the first antenna 3, or across the lower and upper electrodes 9 and 10 respectively of the second antenna 5, or to derive and record the difference between the two DC voltages being developed at the same time at both antennae 3 and 5. The magnitude of DC voltage which can be developed at any one time depends, as hereinbefore indicated, upon the characteristics of the earth materials immediately below the particular bumper. Inasmuch as the front and rear bumpers 4 and 6 are spaced only about 16-20 feet apart, both DC voltages will usually vary only as a function of thickness of a particular formation of interest, except where the vehicle 2 traverses a "push-out" or other termination of the formation. It has been found that there is usually a particularly high degree of ionization encountered adjacent any termination or boundary of any subsurface formation, and thus a comparison of the two DC signals will often provide a very distinct indication of the boundary limits of a subsurface earth formation.

It should also be noted that the ionization, which exists in the atmosphere within the first 10-12 feet about the earth's surface, is a function of many electromagnetic fields besides those generated by subsurface formations of interest. Accordingly, it is desirable to filter out the AC components of the potentials being developed across the two pairs of electrodes 7-10, and it is also often desirable to eliminate unwanted DC components which are unrelated to subsurface formations of interest.

Figure 2:
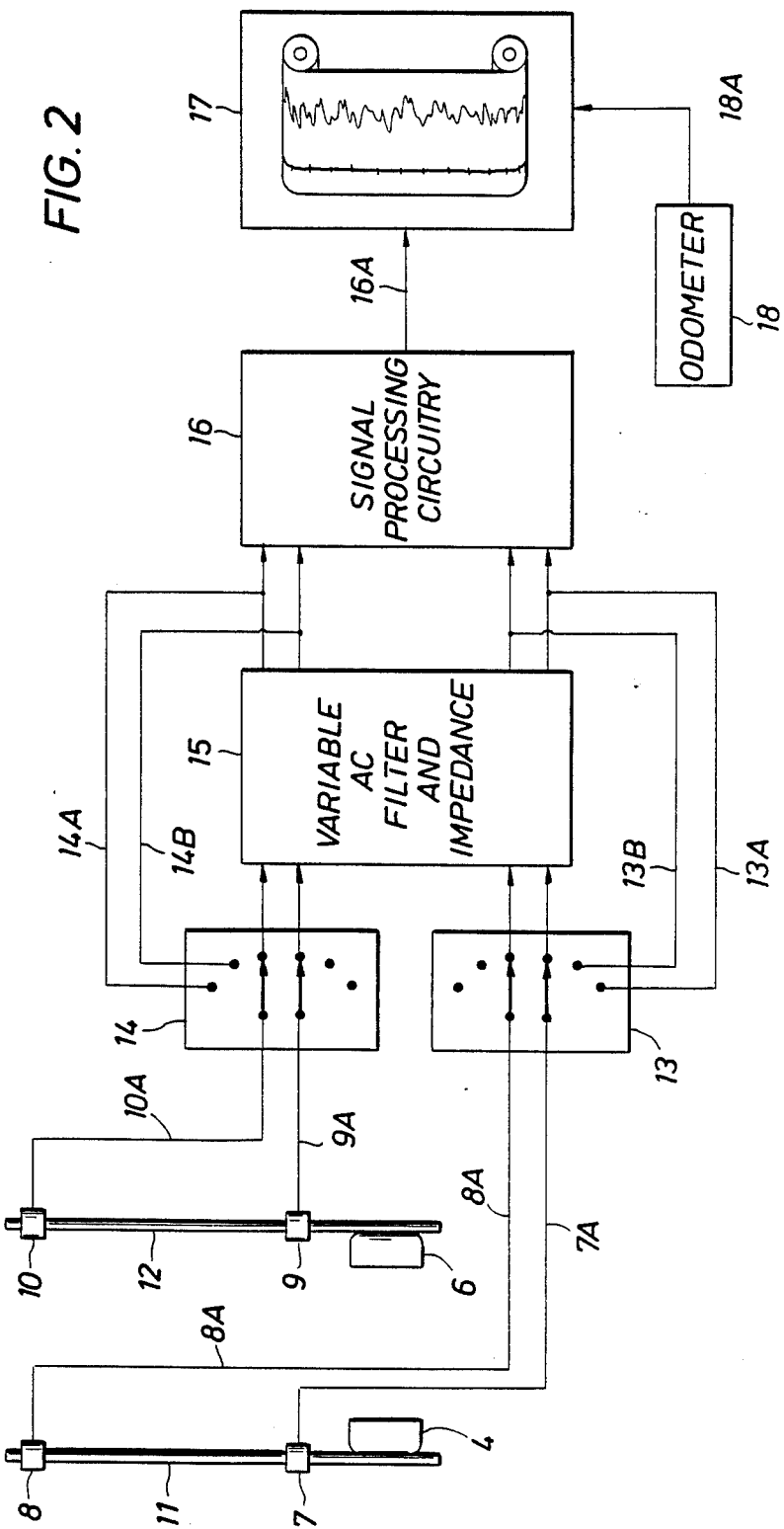
FIG. 2 is a simplified functional representation of of survey apparatus embodying the present invention and generally indicated in FIG. 1.

Referring now to FIG. 2, there may be seen a simplified functional representation of one embodiment of apparatus suitable for the purposes of the present invention, wherein the lower and upper electrodes 7 and 8 respectively of the first antenna 3 may be selectively interconnected with variable AC filter and impedance circuits 15, by way of conductors 7A and 8A and switch 13, and wherein the lower and upper electrodes 9 and 10 respectively of the second antenna 5 may also be selectively interconnected with the same variable AC filter and impedance circuits 15, by way of conductors 9A and 10A and switch 14. As hereinbefore stated, it is within the concept of the present invention to derive and utilize the output from only the first antenna 3, or from only the second antenna 5, or to utilize the outputs from both antennae 3 and 5 at the same time. Accordingly, it is preferable that switches 13 and 14 be capable of selectively connecting or disconnecting their respective inputs from the other circuitry depicted in FIG. 2.

More particularly, switch 14 may be adapted and arranged to simply connect or disconnect the electrodes 9 and 10 to the AC filter 15, or it may be used to by-pass the AC filter 15 and couple the electrodes 9 and 10 directly to the signal processing circuit 16. Similarly, switch 13 may be adapted and arranged to connect or disconnect the other electrodes 7 and 8 to its portion of the AC filter circuit 15 and couple the two electrodes 7 and 8 directly to the signal processing circuit 16. Switches 13 and 14 may be arranged to operate independently of each other, or they may be gauged together for some purposes.

As hereinbefore indicated, the present invention differs from the prior art because it does not employ the AC components of the various electromagnetic fields to which the antennae 3 and 5 are exposed but, instead, employs the DC components of these fields. Accordingly, it is also preferable that switches 13 and 14 also be capable of selectively connecting their respective inputs directly to signal processing circuitry 16 by way of conductors 13A-B and 14A-B, or into the inputs of a variable AC filter and inpedance circuitry 15.

Referring again to FIG. 2, it should be noted that the spacing between each pair of electrodes 7-10 is a function of the spacings between the lower electrodes 7 and 9 and the surface of the earth. Because of practical necessities, the two lower electrodes 7 and 9 must each be positioned at least 12-18 inches above the earth's surface. However, it should also be noted that the smaller that distance, the shorter will be the spacing between the electrodes 7-10 in each antenna 3 and 5, in order to achieve effective operation of any embodiment of the present invention.

On the other hand, it should also be recognized that since it is an object of the present invention to make a DC-dependent measurement of the ionization at each antenna 3 and 5, it is necessary to establish at least a minimum spacing between the electrodes in each pair. Therefore, when the lower electrodes 7 and 9 are positioned only 12 to 18 inches above the earth's surface, the upper electrodes 8 and 10 must be spaced at least 18 to 24 inches above the lower electrodes 7 and 9 respectively.

It has been found that, when the lower electrodes 7 and 9 are spaced a minimum distance above the surface of the earth, the readings of potential between the electrodes in each antenna 3 and 5 will improve as the spacing between upper and lower electrodes is increased. In theory, there is no maximum limit to the spacings between upper and lower electrodes, insofar as concept of the present invention is concerned. In practice, however, and as affected by the particular weather conditions, there is an effective limit of ten to twenty feet in spacing between the electrodes on each mast 11 and 12, because the potential on each of the upper electrodes 8 and 10 tends to diminish in basic magnitude as this spacing is increased. In particular, when the upper electrodes 8 and 10 are raised 400-500 feet or more above the lower electrodes 7 and 9, the measured differential at the upper electrodes 8 and 10 tends to become indistinguishably different from the potential at the lower electrodes 7 and 9.

On the other hand, this phenomenon tends to reverse itself as the lower electrodes 7 and 9 are lifted more than 200 feet above the surface of the earth, as when an embodiment of the present invention is sought to be employed in an aeroplane and the like. In such a case, however, it is usually desirable to further extend the elevations of the upper electrodes above the earth to emphasize the differentials between the electrodes in each pair. This is because the measurable voltages on each electrode tend to diminish as that electrode is lifted above the earth, and increasing the spacing between the electrodes in each pair tends to emphasize the differential in potential between the electrode in each pair.

Figure 3A:
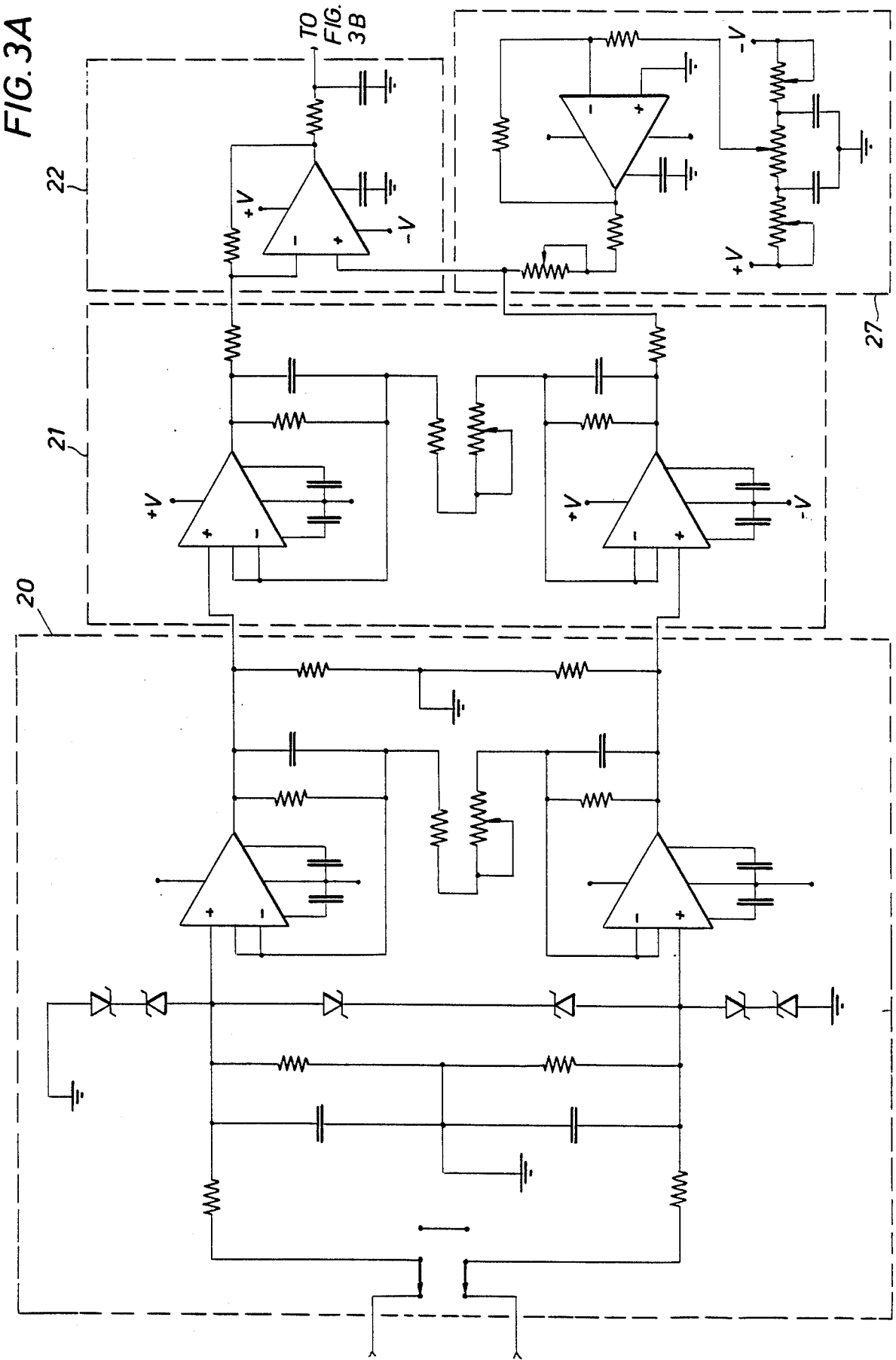
FIG. 3A is a simplified schematic representation of a portion of the apparatus depicted in FIG. 2.
Figure 3B:
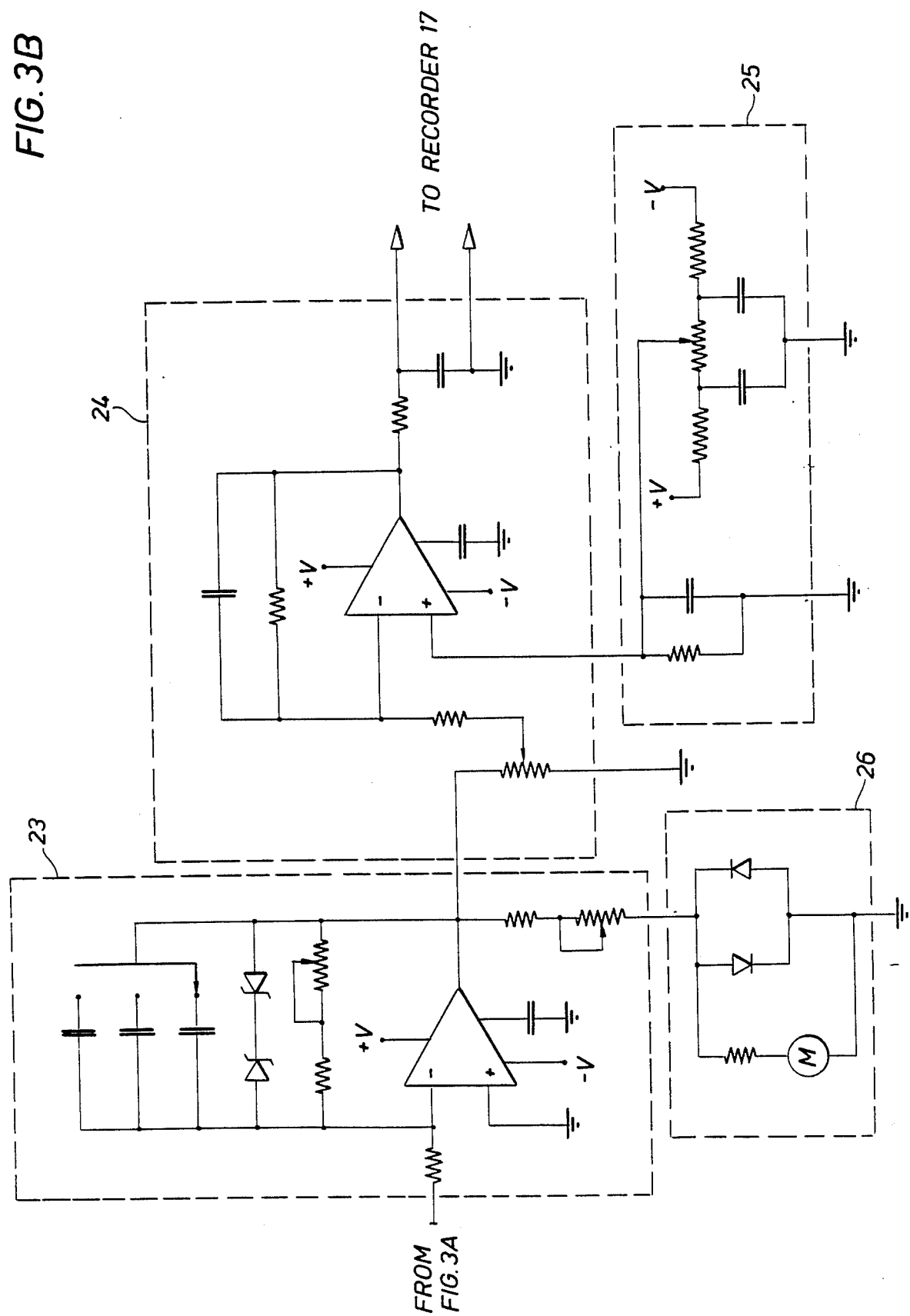
FIG. 3B is a simplified schematic representation of a portion of the apparatus depicted in FIG. 2.

Referring now to FIG. 3A and 3B, there may be seen a simplified functional representation of one form of the signal processing circuitry 16 indicated in FIG. 2, wherein the output signals from the conductors 13A-B and/or 14A-B may be applied to the input of a pre-amplifier circuit 20 having an appropriate differential gain. As may further be seen, the output of the pre-amplifier 20 is then preferably directed to the input of a main amplifier 21 which, in turn, has its output connected to the input of a comparator circuit 22.

As hereinbefore indicated, the signal from either or both antennae 3 and 5 is inherently weak in amplitude, and therefore this signal must be suitably amplified before it can be used. However, reliance cannot be had on the main amplifier 21 alone, because this will incur the risk that the incoming signal may lie along the distorted portion of the amplifier's gain curve. Furthermore, it is desirable to keep the two incoming antenna signals equalized at all times it is intended to utilize both such signals, and this is more easily achieved by balancing these two amplification circuits.

Referring to the pre-amplifier circuit 20 in particular, it is preferable to employ a circuit operating over a 0-200,000 range. Referring likewise to the main amplifier 21 in particular, it is preferable to employ a circuit operating over 0-4,000 range, in order to best achieve the objects of the present invention.

As may further be seen in FIG. 3A, the outputs from the main amplifier 21 may then be applied to the input of a comparator circuit 22. Both electrodes 7 and 8 are disposed in the atmosphere above the ground, and are spaced an appropriate distance apart. Therefore, the voltage differentials between such pairs of electrodes will be a function of the ionization of the atmosphere at that location which, in turn, is a function of the lithology below the vehicle.

Referring again to FIG. 3A, it should be noted that an appropriate null and common mode reject circuit 27 may conveniently be included to select and establish the most suitable reference voltage to be maintained at the positive input terminal of the comparator circuit 22. This is to make the amplifier in the comparator circuit 22 operate within the straight line portion of its gain curve, rather than along the distorted portions. The purpose of the common mode reject portion of circuit 27 is to establish a "common" or reference value for the amplifier, in the comparator circuit 22, at either positive or negative relative to the common or reference voltage of the overall system.

Referring again to FIG. 3A, it may be seen that the processing circuitry 16 depicted therein may conveniently include an appropriate voltmeter circuit 26 to permit visual observations and monitoring of the signal being transferred from main recorder gain circuit 23 to the secondary recorder gain circuit 24. The purpose of the main recorder gain circuit 23 is to receive and amplify the output from the comparator 22 to an amplitude great enough to drive the recorder depicted in FIG. 2. The purpose of the secondary recorder gain circuit 24 is the same, except that the main recorder gain circuit 23 is a fixed value circuit, whereas the secondary recorder gain circuit 24 preferably is adapted to provide a variable output signal.

Referring again to the main recorder gain circuit 23, however, it should also be noted that this component may conveniently include a time-constant selection circuit. The AC filter 15 in FIG. 2 will remove most, but not all, of the AC components from the signals received by the antennae 3 and 5. Although the remaining AC components of the incoming signal are initially small, they tend to grow to unacceptable magnitudes as the signal is passed through the various amplifying stages in this circuitry. Therefore, the purpose of the time constant select portion, of the main recorder gain circuit 23, is to remove these unwanted components from the processed signal 16A being applied to the recorder 17 in FIG. 2.

Referring again to the time constant select portion of the main recorder gain circuit 24, it should be noted that this circuitry does not remove the AC components from signal 16A in the same manner of a true filter. Instead, it introduces a time delay factor whereby one AC signal merges with and cancels another. A conventional AC filter circuit is not desirable for this purpose because, even though it removes the AC component, it tends to affect the validity of the DC component by modulating its amplitude and shifting its reference with respect to the null voltage previously established in the comparator circuit 22.

Referring again to the secondary recorder gain circuit 24, it will be noted that this component operates in conjunction with a recorder zero offset circuit 25. More particularly, the purpose of the recorder zero offset circuit 25 is to permit the reference voltage, on the positive input terminal of the amplifier in the secondary recorder gain circuit 24, to be varied in order to permit "zero" to be suitably located on the chart of the recorder 17.

Other variations and adaptations may, of course, be made in the techniques and structures hereinbefore described, depending upon particular needs and circumstances. As previously stated, there is usually an optimum spacing between a particular pair of electrodes, and inasmuch as the purpose of using two pairs of electrodes is to provide two confirming measurements or to detect the location of a fault, it is usually preferable to employ the same spacing for both pairs of electrodes. Furthermore, movement of the vehicle across irregular terrain may dislodge and change the spacing between one or both electrode pairs, and thus it is usually desirable to fixedly position the electrodes to the supporting mast.

In some instances, however, it is desirable to employ a different spacing when measurements are made under different weather or other conditions, and therefore it may be preferable in such instances to attach the electrodes in a manner whereby one or both may be selectively positioned along the length of the mast. Furthermore, such an arrangement will permit the use of a different spacing between the electrodes at one end of the vehicle, in those instances when it may be sought to make two different but correlated measurements during the same traverse by the vehicle.

In a broad sense, it would appear from usage of the present invention that it is the magnitude of the difference between two electrode potentials which can indicate either the presence or absence of petroleum below the vehicle. More particularly, however, this indication tends to become manifest when the measured difference is less than a predetermined or pre-set reference value, rather than as a quantity in and of itself. Accordingly, where the electrodes are vehicle-borne and spaced as hereinbefore stated, a suitable minimum voltage differential will usually be on the order of $10^{-6}$ volt. In contrast, where the electrodes are airborne and are spaced apart as hereinbefore prescribed, a suitable minimum differential will be on the order of $10^{-9}$ volts. These values, of course, will necessarily depend upon atmospheric conditions, time of day, elevation above sea level, etc.

These and other variations will be apparent from the drawings and detailed description as hereinbefore set forth. Accordingly, it should be clearly understood that the structures and techniques described and depicted herein, are illustrative only, and are not provided as limitation on the scope of the present invention.

WHAT IS CLAIMED IS:

1. A method for performing passive geophysical measurements as a function of natural Earth currents, said method comprising:
   (a) sensing an electrical potential occurring between at least one pair of vertically spaced points above the Earth and within the lower atmosphere adjacent thereto as a function of said natural Earth currents;
   (b) generating an electrical signal proportional to said electrical potential, said electrical signal having an AC component and a DC component;
   (c) filtering out the AC component of said electrical signal leaving the DC component thereof and outputting a DC signal; and
   (d) measuring said DC signal, said DC signal providing an indication of the lithological character of adjacent Earth materials as a function of the DC component of said electrical potential.

2. The method according to claim 1, wherein said sensing step comprises:
   (1) positioning at least one pair of vertically spaced electrodes corresponding to each of said at least one pair of vertically spaced points, wherein each of said at least one pair of electrodes consists essentially of a lower electrode and an upper electrode, said positioning step comprising
      (i) spacing said lower electrode above the Earth and within the lower atmosphere adjacent thereto and
      (ii) positioning said upper electrode within the lower a atmosphere and vertically above said lower electrode; and
   (2) sensing said electrical potential occurring between each pair of said at least one pair of electrodes which correspond to each pair of said at least one pair of vertically spaced points.

3. The method according to claim 1, wherein
said at least one pair of vertically spaced points is a single pair of vertically spaced points and
said measuring step measures the magnitude of the DC component of said electrical potential.

4. The method according to claim 2, wherein
said at least one pair of vertically spaced electrodes is a single pair of vertically spaced electrodes and
said measuring step measures the magnitude of the DC component of said electrical potential.

5. The method according to claim 1, wherein
said at least one pair of vertically spaced points is a first and a second pair of vertically spaced points, said second pair of vertically spaced points being horizontally spaced from said first pair of vertically spaced points, and
said measuring step measures the difference between the magnitude of the DC component of said electrical potential from said first and said second pair of electrodes.

6. The method according to claim 2, wherein
said at least one pair of vertically spaced electrodes is a first and a second pair of vertically spaced electrodes, said second pair of vertically spaced electrodes being horizontally spaced from said first pair of vertically spaced electrodes, and
said measuring step measures the difference between the magnitude of the DC component of said electrical potential from said first and said second pair of electrodes.

* * * * *